United States Patent
Smith (10) Patent No.: US 10,193,764 B2
(45) Date of Patent: Jan. 29, 2019

(54) METHOD AND SYSTEM FOR OFFERING SUBSCRIBER SERVICE PLANS BY ADAPTIVE CODING AND MODULATION USED

(71) Applicant: Brian Smith, Mt. Airy, MD (US)

(72) Inventor: Brian Smith, Mt. Airy, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 118 days.

(21) Appl. No.: 15/287,687

(22) Filed: Oct. 6, 2016

(65) Prior Publication Data

US 2018/0102949 A1 Apr. 12, 2018

(51) Int. Cl.
| | | |
|---|---|---|
| H04L 12/24 | (2006.01) | |
| H04B 17/318 | (2015.01) | |
| H04B 17/336 | (2015.01) | |
| H04B 7/185 | (2006.01) | |
| H04L 1/00 | (2006.01) | |
| H04W 28/24 | (2009.01) | |
| H04W 88/16 | (2009.01) | |

(52) U.S. Cl.
CPC ..... *H04L 41/5022* (2013.01); *H04B 7/18517* (2013.01); *H04B 7/18543* (2013.01); *H04B 17/318* (2015.01); *H04B 17/336* (2015.01); *H04L 1/00* (2013.01); *H04L 1/0003* (2013.01); *H04L 1/0009* (2013.01); *H04L 1/0013* (2013.01); *H04W 28/24* (2013.01); *H04W 88/16* (2013.01)

(58) Field of Classification Search
CPC ............ H04B 7/18528; H04B 7/18513; H04B 7/1851; H04B 7/18593; H04W 24/00
See application file for complete search history.

(56) References Cited

U.S. PATENT DOCUMENTS

| | | | |
|---|---|---|---|
| 2006/0215628 A1 | 9/2006 | Olariu et al. | |
| 2011/0131615 A1* | 6/2011 | Lee | H04H 20/51 725/63 |

(Continued)

FOREIGN PATENT DOCUMENTS

| | | |
|---|---|---|
| EP | 0978955 A1 | 2/2000 |
| EP | 1906578 A2 | 4/2008 |
| EP | 2600553 A1 | 6/2013 |

OTHER PUBLICATIONS

International Search Report for corresponding PCT application PCT/US2017/054239 dated Jan. 4, 2018.

*Primary Examiner* — Kan Yuen
(74) *Attorney, Agent, or Firm* — Capitol City TechLaw; Jasbir Singh (57) ABSTRACT

A method for providing service levels in a Radio Frequency (RF) network is disclosed. The method including: associating one or more service levels with each supported symbol rate, modulation and error correction encoded scheme (ModCod); assigning a subscriber service level for a RF transmitter; receiving a signal quality of a transmission by the RF transmitter; selecting a transmit ModCod from the supported ModCods, wherein the signal quality exceeds a threshold signal quality for the transmit ModCod; and authorizing the RF transmitter to transmit to the receiver when the subscriber service level is included in the one or more service levels associated with the transmit ModCod, wherein signal quality adapts to a signal fade.

18 Claims, 5 Drawing Sheets

(56) References Cited

U.S. PATENT DOCUMENTS

| | | | | |
|---|---|---|---|---|
| 2012/0170594 A1* | 7/2012 | Davis | ................ | H04B 7/18528 370/468 |
| 2012/0188880 A1* | 7/2012 | Beeler | .................. | H04L 41/145 370/246 |
| 2014/0160970 A1* | 6/2014 | Beeler | ................ | H04B 7/18519 370/252 |

* cited by examiner

| Modulation | FEC Rate | MODCOD | Ideal Quasi Error Free performance threshold PER = 10-7 (db Es/No) | Spectral Efficiency |
|---|---|---|---|---|
| QPSK | 1/2 | 4 | 1.00 | 0.988858 |
| | 3/5 | 5 | 2.23 | 1.188304 |
| | 2/3 | 6 | 3.10 | 1.322253 |
| | 3/4 | 7 | 4.03 | 1.487473 |
| | 4/5 | 8 | 4.68 | 1.587196 |
| | 5/6 | 9 | 5.18 | 1.654663 |
| | 8/9 | 10 | 6.20 | 1.766451 |
| | 9/10 | 11 | 6.42 | 1.788612 |
| 8-PSK | 3/5 | 12 | 5.50 | 1.779991 |
| | 2/3 | 13 | 6.62 | 1.980636 |
| | 3/4 | 14 | 7.91 | 2.228124 |
| | 5/6 | 15 | 9.35 | 2.478562 |
| | 8/9 | 16 | 10.69 | 2.646012 |
| | 9/10 | 17 | 10.98 | 2.679207 |

More robust, lower capacity

METHOD AND SYSTEM FOR OFFERING SUBSCRIBER SERVICE PLANS BY ADAPTIVE CODING AND MODULATION USED

FIELD

The present teachings disclose methods and systems to segregate service plans for customers subscribing to internet satellite service on networks operating with Adaptive Coding and Modulation (ACM). Wireless communications, in particular, Radio Frequency (RF) communications, use ACM to match a symbol rate, modulation, coding, other signal, and protocol parameters to conditions of the communications channel (radio link). In some embodiments, the ACM can be per the Digital Video Broadcasting-Satellite-Second Generation (DVB-S2) standard.

BACKGROUND

Adaptive Coding and Modulation (ACM) operates by adapting a modulation and forward error correction waveform that carries user data into discreet time sliced data blocks with varying degrees of symbol rate, modulation and error correction encoded per block (ModCod). An ACM scheme may also alter/adapt a symbol rate of the signal. The symbol rate may be adapted with or without adaptions to the modulation and error correction. In some embodiments, the symbol rate may be fixed and not subject to adaption.

Data delivered using lower order ModCods are more robust to signal degradation at the expense of consuming a higher amount of available forward direction bandwidth. Conversely, data delivered using higher order ModCods consumes less forward direction bandwidth at the expense of being less robust to signal degradation. Thus, there is an inverse relationship between bandwidth consumption and throughput performance Prior art service plans are based on traffic priority and raw data usage, with all users allowed to operate on the ModCod necessary under current fade conditions. All users, regardless of service plan, are allowed to operate on the entire set of operational ModCods. These plans do not account for the bandwidth efficiency loss when large numbers of lower revenue users are forced by signal fade, for example, due to inclement weather conditions, to use less efficient higher availability coding rates. Under the signal fade subscribers on higher rate plans are penalized as less bandwidth is available. Adding ModCod restrictions to lower cost subscribers provides another dimension to the differentiation of services. When conditions are good, the system provides service to the entire set of subscribers in the mix, and as conditions deteriorate the system automatically sheds the lower cost/service level subscriber traffic.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings take advantage of the inverse relationship between bandwidth consumption and throughput performance. A data communications service, for example, an internet satellite service, can tier its service offerings by charging less to users that expect less, for example, due to poor ambient conditions, and charging more to users that expect signal robustness even under poor ambient conditions.

ModCod based service plans would limit the lower cost service plans user data to higher capacity less robust rates. These users of these service plans would pay less as they present a lower burden on the available network bandwidth but would have lower availability since the users would not be permitted to operate on more robust lower ModCods where more bandwidth is consumed during periods of signal degradation. Subscribers with higher cost plans would be permitted to adapt over a larger or even full range of available ModCods and would be provided higher availability over a wider range of potential signal degradation. In some embodiments, a data communications service provider can reserve the highest order ModCods for it's own use, a particular user's use, or the like.

A method for providing service levels in a Radio Frequency (RF) network is disclosed. The method including: associating one or more service levels with each supported symbol rate, modulation and error correction encoded scheme (ModCod); assigning a subscriber service level for a RF transmitter; receiving a signal quality of a transmission by the RF transmitter; selecting a transmit ModCod from the supported ModCods, wherein the signal quality exceeds a threshold signal quality for the transmit ModCod; and authorizing the RF transmitter to transmit to the receiver when the subscriber service level is included in the one or more service levels associated with the transmit ModCod, wherein signal quality adapts to a signal fade.

A system to provide service levels in a satellite network is described. The system including: a configuration manager to associate one or more service levels with each supported symbol rate, modulation and error correction encoded scheme (ModCod); a Radio Frequency (RF) transmitter; a subscriber manager to assign to the subscriber a subscriber service level and the RF transmitter; and a ModCod manager. The ModCod manager including: a signal quality monitor to receive a signal quality of a transmission by the RF transmitter, a ModCod selector to select a transmit ModCod from the supported ModCods based on the signal quality, and a transmission authorizer to authorize the RF transmitter to transmit when the subscriber service level is included in the one or more service levels associated with the transmit ModCod, wherein signal quality adapts to a signal fade.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

The terminology used herein is for describing particular embodiments only and is not intended to be limiting of the present disclosure. As used herein, the singular forms "a," "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first," "second," and the like does not imply any particular order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

The present teachings take advantage of the inverse relationship between bandwidth consumption and throughput performance. A data communications service, for example, an internet satellite service, can tier its service offerings by charging less to users that expect less, for example, due to poor ambient conditions, and charging more to users that expect signal robustness even under poor ambient conditions.

Figure 1A:
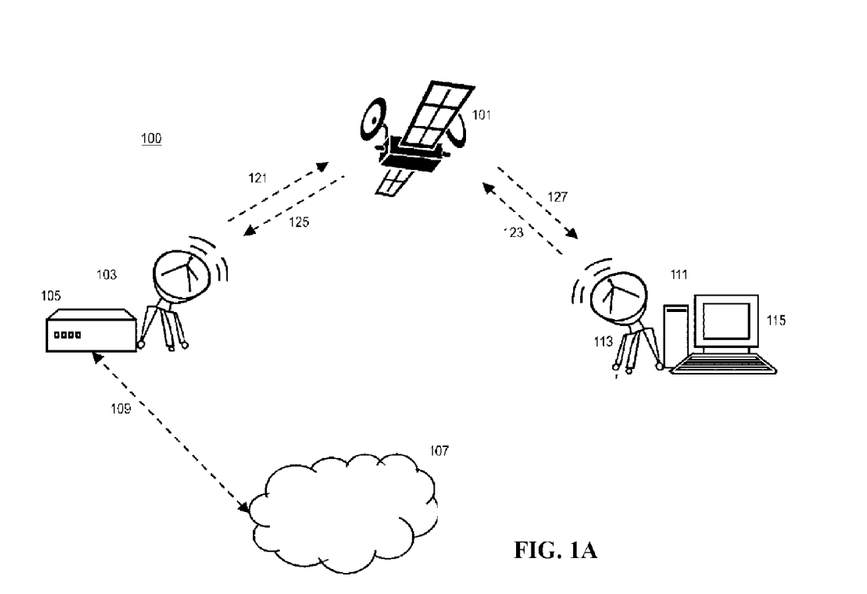
FIG. 1A illustrates a radio communication system or exemplary operating environment according to various embodiments.

FIG. 1A illustrates a radio communication system or exemplary operating environment according to various embodiments.

An exemplary system 100 may include at least one satellite 101 (or a High Altitude Platform (HAP)) and at least one gateway 103 connected via a server or base station 105 to a network 107. The connection 109 between the server and base station 105 to the network 107 may be wired, wireless, or a combination thereof. The network 107 includes one or more wired/data networks (for example, LAN, MAN, WAN, the internet, and the like.) and one or more wireless networks (for example, TDMA, GSM, CDMA, GPRS, EDGE, MBMS, DVB, CSD, HSCSD, and the like.).

The system 100 may include a subscriber system 111. The subscriber system 111 may include an IFL connecting at least one remote ground terminal (e.g., VSAT) 113 and a subscriber terminal 115. The subscribers may be individuals, business entities, governmental agencies, or the like. The subscriber terminal 115 may include access points configured to communicate with other subscriber terminals in the network 107 using, for example, radio frequency (RF), Bluetooth (BT), infrared (IrDA) or any of a number of different wireless networking techniques, including WLAN techniques. The subscriber terminal 115 may be disposed indoors, while the at least one remote ground terminal 113 including a radio may be disposed outdoors.

The remote ground terminal 113 may be utilized at a location for communicating via the satellite 101 to the gateway 103. The remote ground terminal 113 may include a Very Small Aperture Terminal (VSAT). The gateway 103 communicates with multiple remote ground terminals, and has a significantly larger antenna, as well as a significantly larger power output capability than any of the remote ground terminals. The communication satellite 101 receives uplink signals 121 from the gateway 103 and uplink signals 123 from the remote ground based terminal 103. The communication satellite 101 transmits downlink signals 125 to the gateway 103 and downlink signals 127 to the ground-based terminal 113. The gateway 103 sends communication signals to the remote ground terminal 113 via a forward link including the uplink 121 and the downlink 127. The remote ground terminal 113 sends communications signals to the gateway 103 via the return link including the uplink 123 and the downlink 125. In exemplary embodiments, the communication satellite 101 receives signals at a first frequency and transmits signals at a second frequency different from the first frequency.

In some embodiments, no relays or multiple relays (for example, the satellite 101, a High Altitude Platform (HAP)) may be used to communicate between the remote ground terminal 113 and the gateway 103.

Figure 1B:
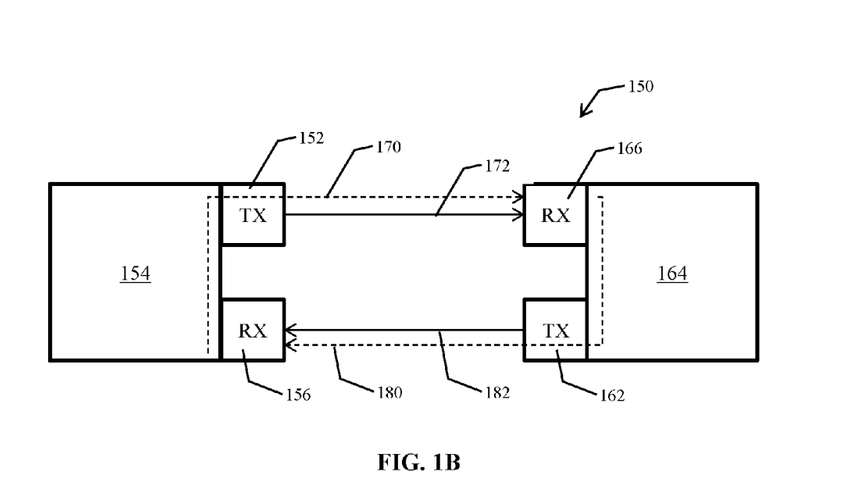
FIG. 1B illustrates a radio communication system or exemplary operating environment according to various embodiments.

FIG. 1B illustrates a radio communication system or exemplary operating environment according to various embodiments.

An exemplary system 150 may include a first radio 154 and a second radio 164. The first radio may include a transmitter 152 and a receiver 156. The second radio may include a transmitter 162 and a receiver 166. The transmitter 152 may communicate with the receiver 166 via an outroute or channel (forward link) 172. The transmitter 162 may communicate with the receiver 156 via an inroute or channel (return link) 182.

In exemplary embodiments, fade conditions at the radio 154 and the radio 164 may differ, for example, when the radio 154 is disposed over 20 miles from the radio 164, or when the signals between the radio 154 and the radio 164 utilize an intermediary transceiver, like a satellite or a HAP (not shown). When fade conditions differ for the radio 154 and the radio 164, a signal strength of the outroute 172 may be measured at the receiver 166 and fed back to the radio 154, for example, via a packet 180 to the inroute 182. When fade conditions differ for the radio 154 and the radio 164, a signal strength of the inroute 182 may be measured at the receiver 156 and fed back to the radio 164, for example, via a packet 170 over the inroute 172.

In some embodiments, regardless of whether fade conditions are the same or different for the radio 154 and the radio 164, a signal strength of the inroute 182 may be assumed to be approximately the same as a signal strength of the outroute 172 at the receiver 166 by the radio 164. Such an assumption can eliminate the need for the feedback to the radio 164, for example, via a packet 170 over the inroute 172.

In some embodiments, regardless of whether fade conditions are the same or different for the radio 154 and the radio 164, a signal strength of the inroute 182 may be assumed to be approximately the same as a signal strength of the outroute 172 at the receiver 166 by the radio 164. Such an assumption can eliminate the need for the feedback to the radio 154, for example, via a packet 180 to the inroute 182.

In exemplary embodiments, the system 150 may be a cellular telephone, Wi-Fi, satellite or other type of 2-way radio system. For example, the radio 154 may be a VSAT (for example, mobile or stationary) and the radio 164 may be a satellite gateway or network operations center. In some embodiments, the radio 154 may be a cell service end-point (for example, a cellphone, a smartphone, a cell mobile device, or the like) and the radio 164 may be a cell service base-station. In some embodiments, the radio 154 and the radio 164 may be a microwave communication systems.

In exemplary embodiments, signal quality on a route (channel) may be measured using a well-known unencoded bit pattern sent whose bit error rate correlates to a signal strength via methods well known in the art. For example, signal quality on a route (channel) may be measured as signal strength or Signal to Noise Ratio (SNR). In other examples, a Signal to Noise Ratio (SNR) divided by the number of bits/symbols may be known as an Es/No.

Figure 2:
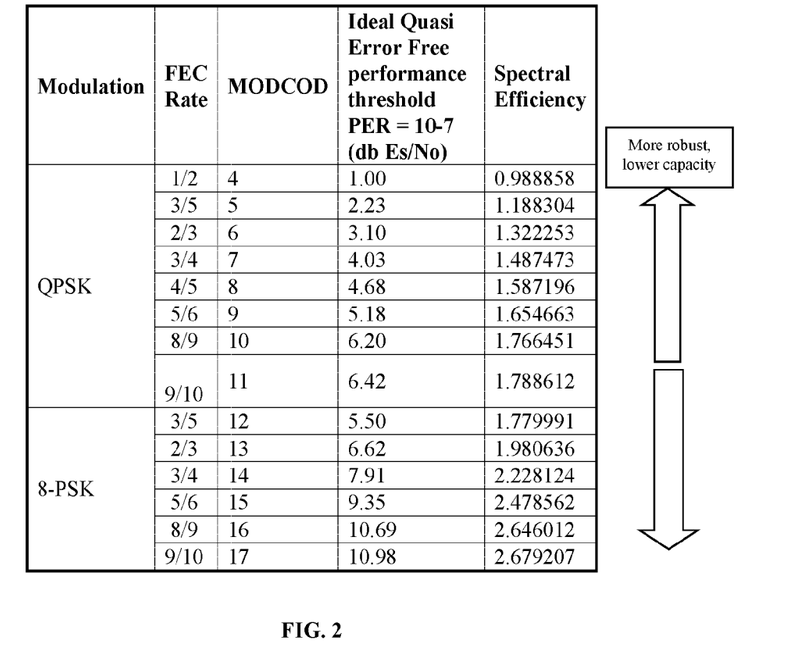
FIG. 2 illustrates the relationship between the performance and spectral efficiency for a typical Digital Video Broadcasting-Satellite-Second Generation (DVB-S2) Adjustable Coding and Modulation (ACM) using Quadrature Phase Shift Keying (QPSK) and 8-Phase Shift Keying (PSK) for a symbol rate, modulation and error correction encoded per block (ModCod) according to various embodiments.

FIG. 2 illustrates the relationship between the performance and spectral efficiency for a typical Digital Video Broadcasting-Satellite-Second Generation (DVB-S2) Adjustable Coding and Modulation (ACM) using Quadrature Phase Shift Keying (QPSK) and 8-Phase Shift Keying (PSK) for a symbol rate, modulation and error correction encoded per block (ModCod).

In the example of FIG. 2, the symbol rate for the supported ModCods is fixed, and as such, not included in the table of FIG. 2. FIG. 2 illustrates various ideal quasi error free performance threshold for a Packet Error Ratio (PER) of about 10-7 for a set of DVB-S2 supported ModCods. The PER is the number of incorrectly received data packets divided by the total number of received packets. A packet is declared incorrect if at least one bit is erroneous. For instance, as seen in the FIG. 2, ModCod-4 can operate at very low signal level in the range of 1 db Es/No with spectral efficiency of ~0.99 while the highest available ModCod-17 in the table needs a higher signal level of ~10.98 db Es/No to operate. However, ModCod-17 can carry ~2.7 times the amount of data of traffic carried on ModCod-4.

In exemplary embodiments, lower cost service plan users may be confined to operate on higher capacity lower availably ModCods. While high revenue customers may operate on all available ModCods to permit maximum availability for the high revenue customers. In exemplary embodiments, for a DVB-S2 ACM mode of operation, all users receive data in code blocks that can be encoded at any available ModCod depending on the ability of the terminal's signal reception conditions. As conditions change, a terminal can adapt and request to have its data sent on a better-suited ModCod.

In exemplary embodiments, VSAT terminals are informed of the ModCods they are allowed to operate on via a trajectory table that is configured into the VSAT. In some embodiments, the trajectory table may be received by the VSAT at VSAT provisioning. In some embodiments, the trajectory table may be received by the VSAT while the VSAT is operational. As such, changes to a user's service plan and corresponding availability may be reflected by trajectory table in or near real-time.

In exemplary embodiments, each table is an ordered list of ModCods and receive signal Es/No thresholds required to operate.

In exemplary embodiments, the present teachings may be used as the sole differentiation between customer service plans. In exemplary embodiments, the present teachings may be used an adjunct overlay mechanism to existing rate based service plans.

In exemplary embodiments, the service plan differentiation is provided by changing or controlling the specific DVB-S2 ACM trajectory table provided to a user of a specific service plan. The following use case scenarios illustrate an application of the present teachings.

In exemplary embodiments, the lowest signal quality between the gateway and the satellite, or the satellite and the VSAT may determine the ModCod used for outgoing communications from the gateway to the VSAT.

In some embodiments, for example, when the satellite includes ModCod capabilities, the ModCod used for communications between the gateway and the satellite may differ from the ModCod used for communications between the satellite and the VSAT. In some embodiments, the ModCod used for communications between the gateway and the satellite may provide a higher spectral efficiency as compared to the ModCod used for communications between the satellite and the VSAT.

Use Case 1: Low Cost Service Plan

Figure 3:
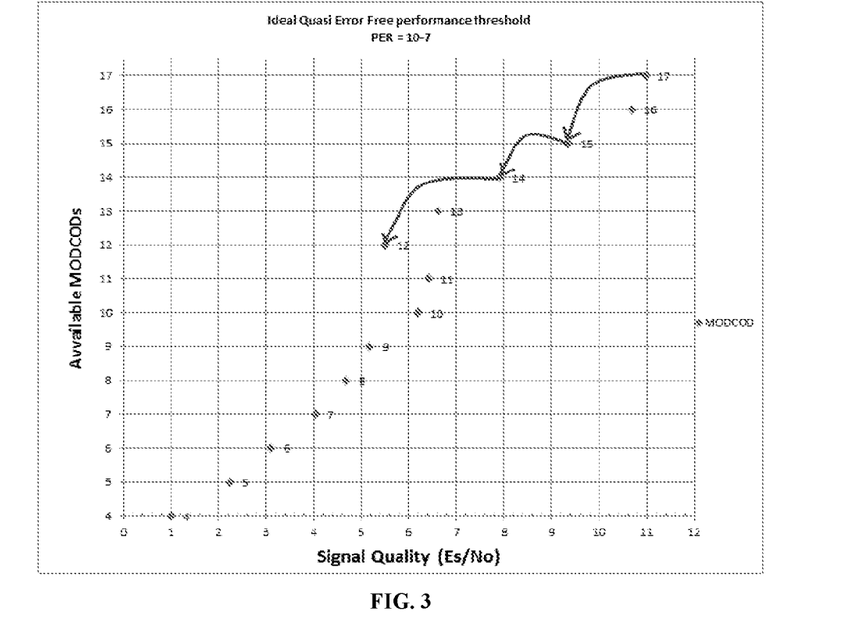
FIG. 3 illustrates a low-cost service plan ModCod trajectory, according to some embodiments.

FIG. 3 illustrates a low-cost service plan ModCod trajectory, according to some embodiments.

As shown in FIG. 3, a transmitter (for example, a gateway or a VSAT) may communicate via a relay (for example, a satellite, a High Altitude Platform (HAP)) with a receiver (for example, a gateway or a VSAT) where a limited trajectory table is authorized for use by a subscriber. In exemplary embodiments, the receiver configured with the limited trajectory table may be associated with a subscriber with a low-revenue or cost service plan. The limited trajectory table allows adaptation to signal quality conditions from above 10.9 down to 5.5 db Es/No. Such a subscriber may pay less but would lose or be denied service when signal fade drops the signal strength on any leg between the transmitter to the receiver below 5.5 db Es/No. Outgoing communications from the transmitter may communicate by using ModCod-17, then ModCod-15, then ModCod-14, and finally ModCod-12. Outgoing communications from the transmitter may skip authorized ModCods, for example, ModCod-16 and ModCod-13 as illustrated in FIG. 3, when signal fade does not allow/permit communications at the signal quality required for the skipped ModCods.

The trajectory table of FIG. 3 allows a receiver to receive communications while operating between ModCod-12 to ModCod-17, i.e., ModCods that range from ~1.78 to 2.68 efficiency. As such, a receiver configured with this trajectory table would not permit a user or subscriber to receive communications when operating between ModCod-4 to ModCod-11, or the ModCods that are more robust, but have lower capacity. If signal quality drops below the signal quality required by ModCod-12, outgoing communications from the transmitter to the receiver (for example, from a VSAT to a gateway, or a gateway to a VSAT) may be interrupted.

Use Case 2: High Price Service Plan

Figure 4:
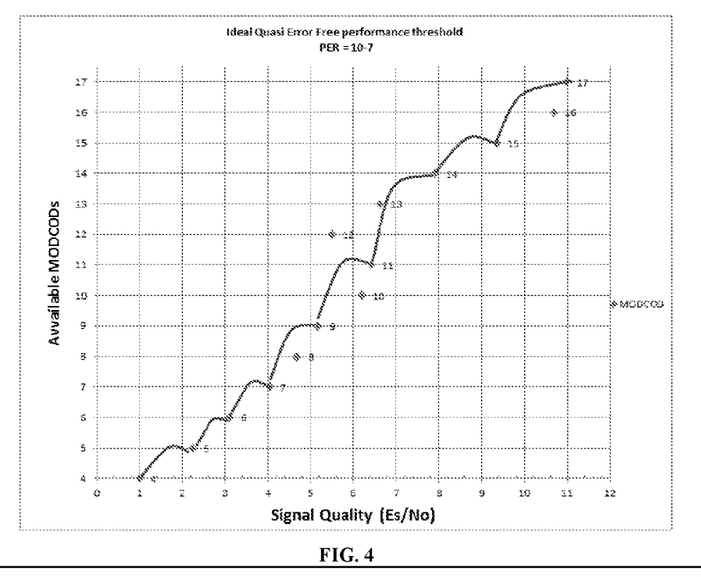
FIG. 4 illustrates a high-cost service plan ModCod trajectory, according to some embodiments.

FIG. 4 illustrates a high-cost service plan ModCod trajectory, according to some embodiments.

As illustrated in FIG. 4, subscribers with high cost service plans may be configured with a trajectory table that allows adaptation to signal quality conditions from above 10.9 down to 1.0 db Es/No by using a range of available ModCods that cover both extremes of high efficiency low availability to low efficiency high availability. As shown in FIG. 4, a transmitter (for example, a gateway or a VSAT) may communicate via a relay (for example, a satellite, a High Altitude Platform (HAP)) with a receiver (for example, a gateway or a VSAT) where a trajectory table is authorized for use by a subscriber. In exemplary embodiments, the receiver configured with the trajectory table may be associated with a subscriber with a high-revenue or cost service plan. This trajectory table allows adaptation to signal quality conditions from above 10.9 down to 1.0 db Es/No. Such a subscriber may pay more but would be denied service only when signal fade drops the signal strength on any leg from the transmitter to the receiver below 1 db Es/No. Outgoing communications from the transmitter may communicate by using any ModCod between ModCod-17 to ModCod-3. Outgoing communications from the transmitter may skip authorized ModCods, for example, ModCod-16 and ModCod-13 as illustrated in FIG. 4, when signal fade does not allow/permit communications at the signal quality required for the skipped ModCods.

Figure 5:
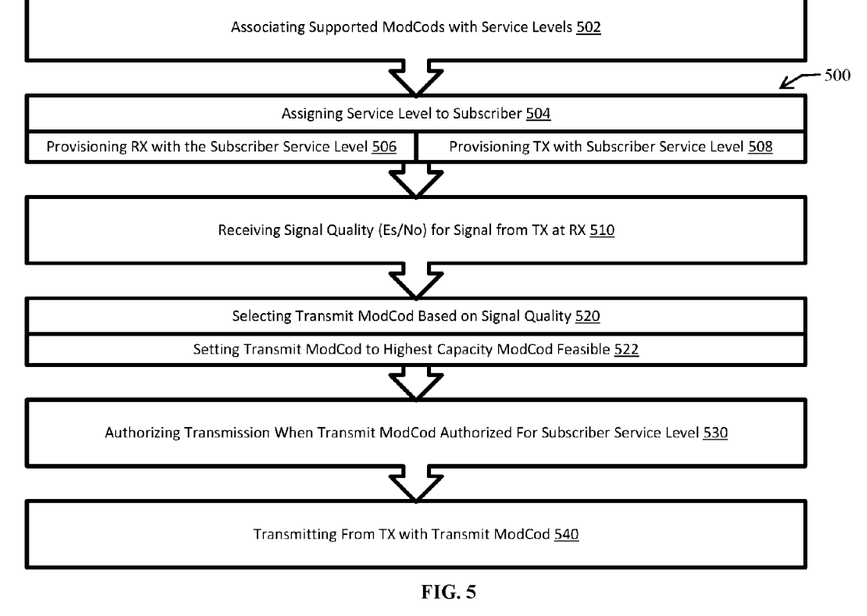
FIG. 5 illustrates a flowchart of an exemplary method that may be implemented according to some embodiments.

FIG. 5 illustrates a flowchart of an exemplary method that may be implemented according to some embodiments.

A method 500 may include an operation for associating supported ModCods with service levels 502. The method 500 may include an operation for assigning service level to subscriber 504. In exemplary embodiments, the operation 504 may assign the service level to equipment, such as, a VSAT including a transceiver, used or assigned to the subscriber. The method 500 may include an operation for provisioning a receiver with the subscriber service level 506, for example, a receiver at a satellite gateway. The method 500 may include an operation for provisioning a transmitter with the subscriber service level 508, for example, a transmitter at a VSAT. The method 500 may include an operation for receiving signal quality (Es/No) for a signal from the transmitter at the receiver 510. The method 500 may include an operation for selecting a transmit ModCod based on the signal quality 520. The method 500 may include an operation for setting the transmit ModCod to a highest capacity ModCod feasible 522 at the signal quality received per operation 510. The method 500 may include an operation for authorizing transmission when the transmit ModCod authorized for subscriber service level 530 per the service levels assigned to the supported ModCods in operation 502. The method 500 may include an operation for transmitting from the transmitter with the transmit ModCod 540.

Figure 6:
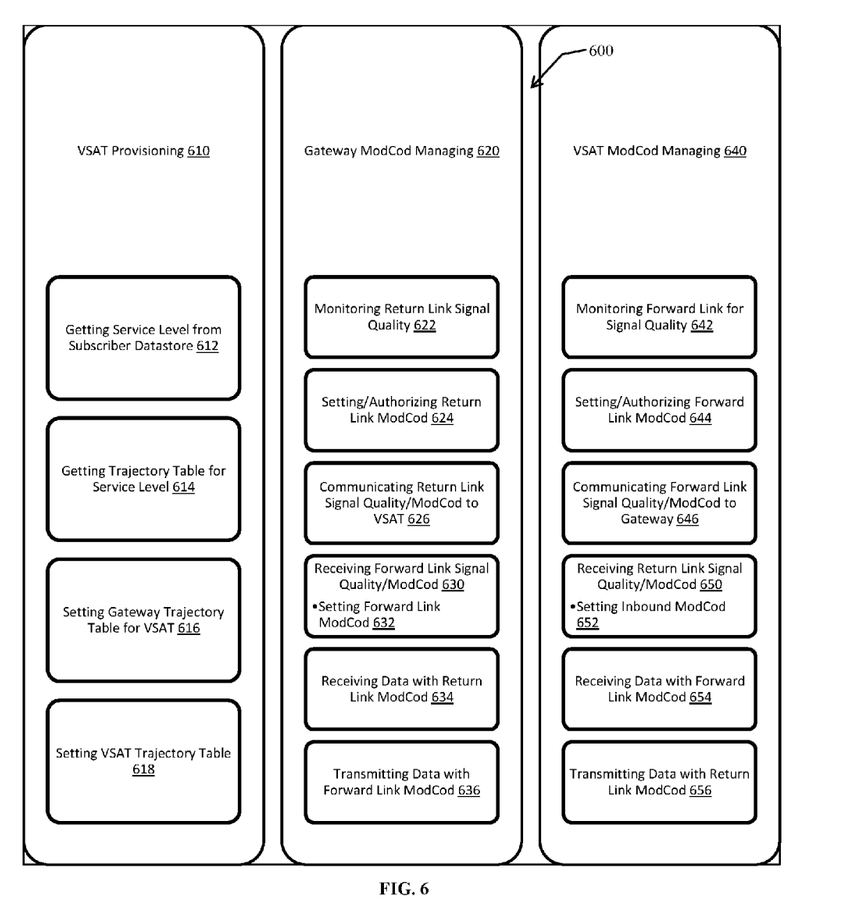
FIG. 6 illustrates a flowchart of an exemplary method that may be implemented according to some embodiments.

FIG. 6 illustrates a flowchart of an exemplary method that may be implemented according to some embodiments.

A method 600 may include operations for VSAT Provisioning 610, gateway ModCod managing 620 and VSAT ModCod managing 640.

Operation 610 may include an operation for getting a service level from a subscriber datastore 612. In addition, operation 612 may identify a VSAT associated with the subscriber. Operation 610 may include an operation for getting a trajectory table for the service level 614. Operation 610 may include an operation for setting a gateway trajectory table for the VSAT 616. Operation 610 may include an operation for setting the VSAT trajectory table 618.

Operation 620 may include an operation for monitoring a return link signal quality 622. Operation 620 may include an operation for setting/authorizing a return link ModCod 624. In exemplary embodiments, when the return link ModCod selected is not operable at the return link signal quality, the authorizing may deny further communications until an authorized ModCod is available given the signal quality. The signal quality may alter in response to changing signal fade. Operation 620 may include an operation for communicating return link signal quality/ModCod to VSAT 626. Operation 620 may include an operation for receiving forward link signal quality/ModCod 630. Operation 620 may include an operation for setting forward link ModCod 632. Operation 620 may include an operation for receiving data with return link ModCod 634. Operation 620 may include an operation for transmitting data with forward link ModCod 636.

Operation 640 may include an operation for monitoring forward link for signal quality 642. Operation 640 may include an operation for setting/authorizing forward link ModCod 644. Operation 640 may include an operation for communicating forward link signal quality/ModCod to gateway 646. Operation 640 may include an operation for receiving return link signal quality/ModCod 650. Operation 640 may include an operation for setting inbound ModCod 652. Operation 640 may include an operation for receiving data with forward link ModCod 654. Operation 640 may include an operation for transmitting data with return link ModCod 656.

Figure 7:
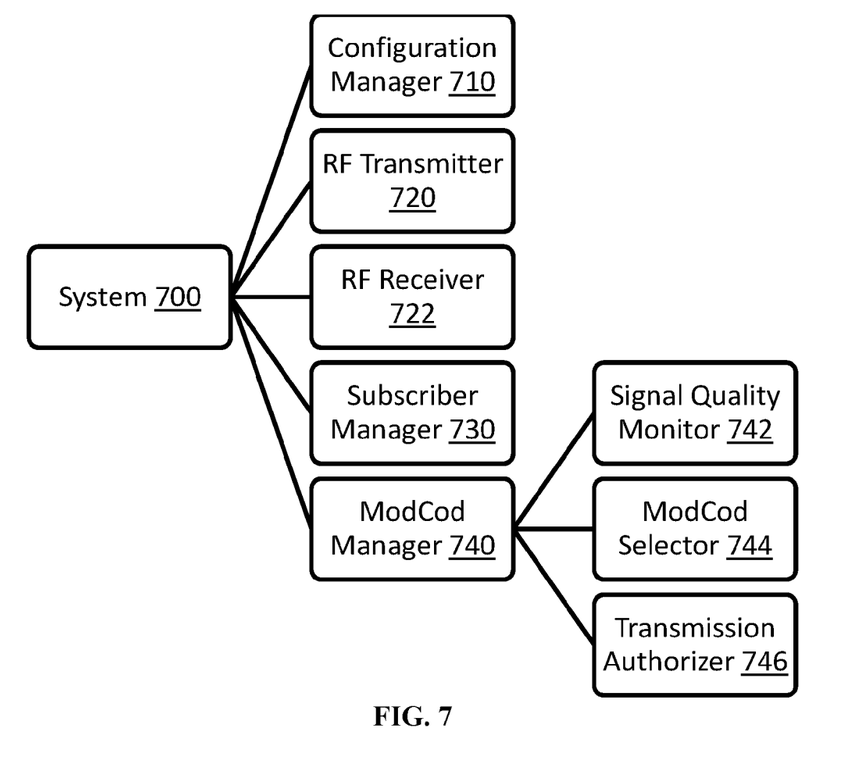
FIG. 7 illustrates an exemplary communication system according to various embodiments.

FIG. 7 illustrates an exemplary communication system according to various embodiments.

A system 700 may include a configuration manager 710, a RF transmitter 720, a subscriber manager 730, and a ModCod manager 740. The ModCod manager 740 may include a signal quality monitor 742, a ModCod selector 744, and a transmission authorizer 746. The configuration manager 710 may implement a method per operation 610 of FIG. 6. The subscription manager 730 may populate a subscriber datastore with information associated a subscriber including a service level, associated VSAT, associated transmitter and the like. In some embodiments, the RF transmitter 720 may perform operation 636 on a gateway, and operation 656 on a VSAT. In some embodiments, the ModCod manager 740 may perform operation 620 on a gateway per FIG. 6, or perform operation 640 on a VSAT per FIG. 6.

In some embodiments, the signal quality monitor 742 may monitor signal quality of received signals. For example, when deployed at a VSAT, the signal quality monitor 742 may monitor signal quality of the signals received from a gateway with or without the use of a relay (a satellite or a HAP) per operation 642. In some embodiments, for example, when deployed at a gateway, the signal quality monitor 742 may monitor signal quality of the signals from one or more VSATs per operation 622, and associate the signal quality of a signal with the VSAT originating the transmission to the gateway.

In some embodiments, the ModCod selector 744 may select a ModCod capable of being received by an RF receiver with an acceptable error rate given a signal quality. In some embodiments, the ModCod selector 744 may select a ModCod that provides the maximum capacity for the signal given a signal quality level. In some embodiments, the ModCod selector 744 may operate per operation 624 on a gateway, or per operation 644 on a VSAT. In some embodiments, the ModCod selector 744 may optionally perform operation 626 on a gateway, or operation 646 on a VSAT.

In some embodiments, the transmission authorizer 746 may ensure that a subscriber is authorized to transmit at a selected ModCod. When authorization is required prior to transmission, a capacity of the signal to be transmitted is preserved for authorized users. In some embodiments, the ModCod selector 744 may operate per operation 624 on a gateway or per operation 644 on a VSAT.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

I claim as my invention:

1. A method for providing service levels in a Radio Frequency (RF) network, the method comprising:
    associating one or more service levels with each supported symbol rate, modulation and error correction encoded scheme (ModCod);
    assigning a subscriber service level for a RF transmitter;
    receiving a signal quality of a transmission by the RF transmitter;
    selecting a transmit ModCod from the supported ModCods, wherein the signal quality exceeds a threshold signal quality for the transmit ModCod; and
    authorizing the RF transmitter to transmit to the receiver when the subscriber service level is included in the one or more service levels associated with the transmit ModCod,
    wherein the signal quality adapts to a signal fade;
    wherein at least one service level of the service levels is not associated with each of the supported ModCods.

2. The method of claim 1, further comprising transmitting from the RF transmitter a signal generated based on the transmit ModCod.

3. The method of claim 1, wherein the signal quality comprises a Signal to Noise Ratio (SNR) divided by a number of bits/symbols for each ModCod in the supported ModCods.

4. The method of claim 1, wherein the selecting comprises selecting the transmit ModCod that provides a maximum capacity without exceeding the threshold signal quality for the transmit ModCod.

5. The method of claim 1, wherein the service levels comprise a first service level for a first revenue-level and a second service level for a second revenue-level, the first revenue-level is higher than the second revenue-level, and the first service level is authorized to use more of the supported ModCods than the second service level.

6. The method of claim 1, wherein the service levels comprise a first service level for a first revenue-level and a second service level for a second revenue-level, the first revenue-level is higher than the second revenue-level, and at least one of the supported ModCods authorized for the first service level are receivable at a lower signal quality than all the supported ModCods authorized for the second service level.

7. The method of claim 1, further comprising providing a satellite gateway and a Very Small Aperture Terminal (VSAT), wherein the VSAT comprises a receiver and the satellite gateway comprises a transmitter.

8. The method of claim 1, further comprising providing a satellite gateway and a Very Small Aperture Terminal (VSAT), wherein the satellite gateway comprises a receiver and the VSAT comprises a transmitter.

9. The method of claim 8, wherein the authorizing is performed at the satellite gateway.

10. A system to provide service levels in a satellite network, the system comprising:
    a configuration manager to associate one or more service levels with each supported symbol rate, modulation and error correction encoded scheme (ModCods);
    a Radio Frequency (RF) transmitter;
    a subscriber manager to assign to a subscriber a subscriber service level and the RF transmitter; and
    a ModCod manager comprising
    a signal quality monitor to receive a signal quality of a transmission by the RF transmitter,
    a ModCod selector to select a transmit ModCod from the supported ModCods based on the signal quality, and
    a transmission authorizer to authorize the RF transmitter to transmit when the subscriber service level is included in the one or more service levels associated with the transmit ModCod,
    wherein the signal quality adapts to a signal fade;
    wherein at least one service level of the service levels is not associated with each of the supported ModCods.

11. The system of claim 10, wherein the signal quality comprises a Signal to Noise Ratio (SNR) divided by a number of bits/symbols for each ModCod in the supported ModCods.

12. The system of claim 10, wherein the ModCod selector selects the transmit ModCod that provides a maximum capacity without exceeding the threshold signal quality for the transmit ModCod.

13. The system of claim 10, wherein the service levels comprise a first service level for a first revenue-level and a second service level for a second revenue-level, the first revenue-level is higher than the second revenue-level, and the first service level is authorized to use more of the supported ModCods than the second service level.

14. The system of claim 10, wherein the service levels comprise a first service level for a first revenue-level and a second service level for a second revenue-level, the first revenue-level is higher than the second revenue-level, and at least one of the supported ModCods authorized for the first service level are receivable at a lower signal quality than all the supported ModCods authorized for the second service level.

15. The system of claim 10, further comprising: a satellite gateway, wherein the satellite gateway comprises a receiver; and a Very Small Aperture Terminal (VSAT), wherein the VSAT comprises a transmitter.

16. The system of claim 15, wherein the satellite gateway comprises the transmission authorizer.

17. The system of claim 15, wherein the VSAT comprises the transmission authorizer.

18. The system of claim 10, wherein the signal quality is based on a reception strength of the transmission at a receiver.

* * * * *